United States Patent
Maeda et al.

(10) Patent No.: US 8,182,245 B2
(45) Date of Patent: May 22, 2012

(54) INVERTER DRIVEN COMPRESSOR OPERATION METHOD AND COMPRESSOR DRIVE DEVICE

(75) Inventors: Hirohito Maeda, Osaka (JP); Keisuke Shimatani, Osaka (JP); Masakazu Katou, Osaka (JP); Takeomi Ukai, Osaka (JP); Hironobu Mizobe, Osaka (JP); Nobuki Kitano, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 702 days.

(21) Appl. No.: 12/224,126

(22) PCT Filed: Jan. 7, 2008

(86) PCT No.: PCT/JP2008/050037
§ 371 (c)(1),
(2), (4) Date: Aug. 19, 2008

(87) PCT Pub. No.: WO2008/084775
PCT Pub. Date: Jul. 17, 2008

(65) Prior Publication Data
US 2010/0232983 A1    Sep. 16, 2010

(30) Foreign Application Priority Data

Jan. 9, 2007 (JP) ................. 2007-001009
Jan. 9, 2007 (JP) ................. 2007-001010

(51) Int. Cl.
*F04B 35/04* (2006.01)
(52) U.S. Cl. .......................... 417/411; 417/45
(58) Field of Classification Search ............ 318/293; 417/411, 44.1, 44.11, 45, 53
See application file for complete search history.

(56) References Cited

U.S. PATENT DOCUMENTS

| 3,413,538 A * | 11/1968 | Hodges ............................ 363/36 |
| 3,916,224 A * | 10/1975 | Daniels et al. ................ 307/265 |
| 6,201,717 B1 | 3/2001 | Grant |
| 2008/0116830 A1* | 5/2008 | Gonzalez et al. ............. 318/446 |
| 2008/0134702 A1* | 6/2008 | Ishikawa et al. ............. 62/228.4 |

FOREIGN PATENT DOCUMENTS

| JP | 61-31859 A | 2/1986 |
| JP | 5-292755 A | 11/1993 |
| JP | 10-318173 A | 12/1998 |
| JP | 11-313496 A | 11/1999 |
| JP | 2001-186793 A | 7/2001 |
| JP | 3250254 B2 | 2/2002 |
| JP | 2002-136106 A | 5/2002 |
| JP | 2003-61363 A | 2/2003 |
| JP | 2005-337234 A | 12/2005 |
| WO | WO 2005103582 A1 * | 11/2005 |

OTHER PUBLICATIONS

Machine Translation of Japanese Patent JP 2003-061363 provided in Applicant's IDS.*

* cited by examiner

*Primary Examiner* — Devon C Kramer
*Assistant Examiner* — Dnyanesh Kasture
(74) *Attorney, Agent, or Firm* — Birch, Stewart, Kolasch & Birch, LLP.

(57) ABSTRACT

A boot capacitor that functions as an operating power supply for a high-arm-side transistor provided in an inverter has to be charged prior to normal operation of a motor. This operation of charging the boot capacitor is performed at a carrier frequency that is lower than a carrier frequency for the normal operation.

18 Claims, 9 Drawing Sheets

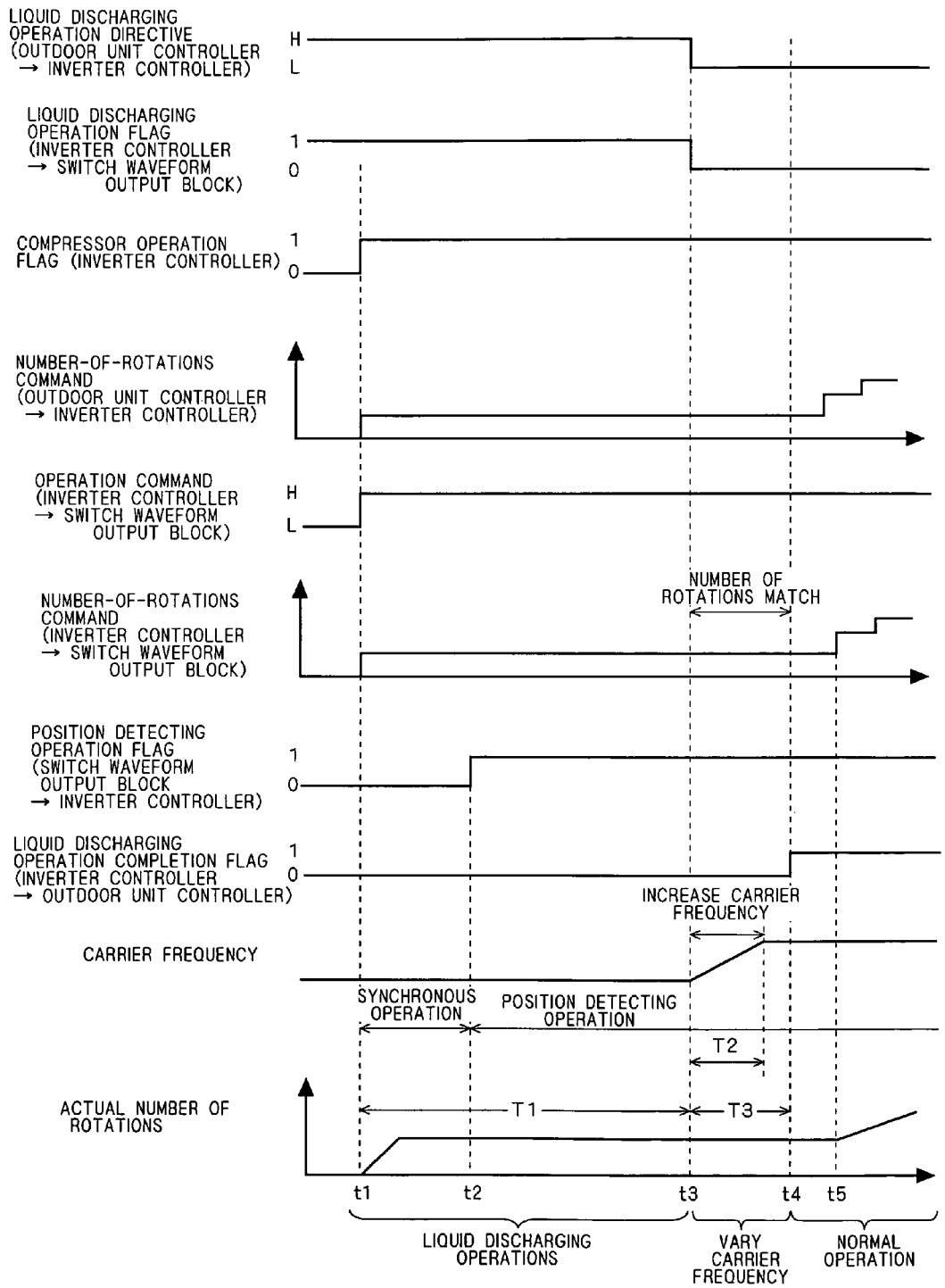

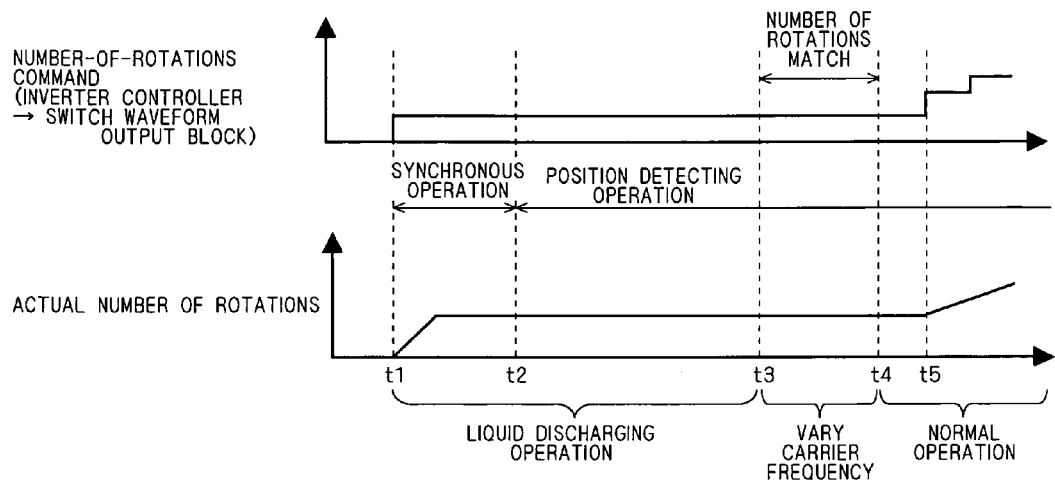
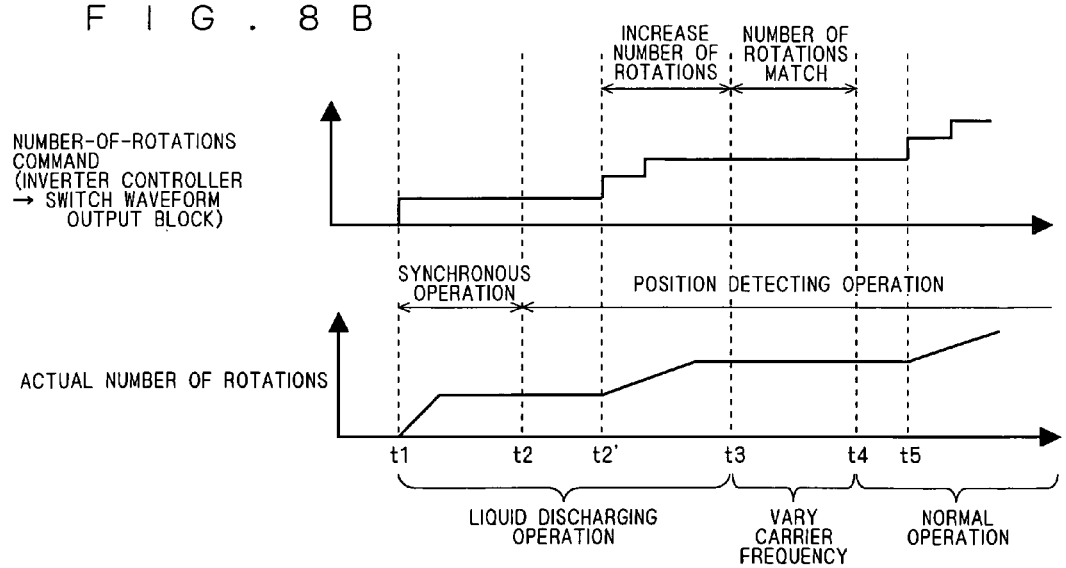

INVERTER DRIVEN COMPRESSOR OPERATION METHOD AND COMPRESSOR DRIVE DEVICE

TECHNICAL FIELD

The present invention relates to a method for operating an inverter driven compressor and to a compressor driving device, and particularly to a technique for reducing leakage current.

BACKGROUND ART

In an inverter for driving a compressor through a motor, preheating operation and liquid discharging operation are performed prior to the normal operation of the compressor. The preheating operation is an operation which preheats the motor for driving the compressor by causing a current to flow to the motor. The liquid discharging operation discharges the liquid refrigerant accumulated in the compressor into a refrigerant circulating path. In distinction from normal operation, the preheating operation and liquid discharging operation are regarded as preparatory operation.

When a boot capacitor is provided to function as an operating power supply for a high-arm-side transistor of the inverter, it is necessary to charge the boot capacitor. This charging operation may also be performed as preparatory operation. Alternatively, the boot capacitor may be charged while halting the operation after performing the preparatory operation, and then sift to normal operation is conducted. Or, the boot capacitor may be charged during normal operation.

Techniques related to the present invention include Patent Documents 1 to 4.

Patent Document 1: Japanese Patent Application Laid-Open No. 2005-337234
Patent Document 2: Japanese Patent Application Laid-Open No. 61-31859 (1986)
Patent Document 3: Japanese Patent Application Laid-Open No. 10-318173 (1998)
Patent Document 4: Japanese Patent Application Laid-Open No. 2001-186793

DISCLOSURE OF THE INVENTION

Problems to be Solved by the Invention

The leakage current occurring during boot capacitor charging operation is larger than leakage currents occurring during other operations (e.g. preheating operation). Accordingly, it might cause a leakage breaker to operate.

Accordingly, an object of the present invention is to provide an inverter driven compressor operating method and a compressor driving device with reduced leakage current.

Means for Solving the Problems

According to a first aspect of the inverter driven compressor operating method of the present invention, in an inverter driven compressor operating method for operating an inverter driven compressor (11) that compresses a refrigerant, said inverter driven compressor is driven by a motor (M1) that is supplied with an alternating current from an inverter (4) having a high-arm-side switch (401) and a boot capacitor (407) functioning as an operating power supply for outputting a switch signal to said high-arm-side switch, said method comprises the steps of: performing a normal operation of said compressor; and performing an operation of charging said boot capacitor performed prior to a normal operation of said compressor is performed at a carrier frequency that is lower than a carrier frequency for said normal operation.

According to a second aspect of the inverter driven compressor operating method of the present invention, in the inverter driven compressor operating method of the first aspect, the carrier frequency for said boot capacitor (407) charging operation is equal to or lower than a carrier frequency for a preparatory operation performed prior to said normal operation.

According to a third aspect of the inverter driven compressor operating method of the present invention, in the inverter driven compressor operating method of the first aspect, said method further comprises the steps of performing a preparatory operation between said boot capacitor (407) charging operation and said normal operation;, said preparatory operation being performed at a carrier frequency that is lower than the carrier frequency for said normal operation; and moving to the normal operation while increasing the carrier frequency to the carrier frequency for said normal operation in a monotone nondecreasing manner.

According to a fourth aspect of the inverter driven compressor operating method of the present invention, in the inverter driven compressor operating method of the third aspect, said preparatory operation is a liquid discharging operation in which said refrigerant accumulated inside said compressor (11) is discharged.

According to a fifth aspect of the inverter driven compressor operating method of the present invention, in the inverter driven compressor operating method of the third or fourth aspect, the carrier frequency used in said boot capacitor (407) charging operation is not more than the carrier frequency for said preparatory operation.

According to a sixth aspect of the inverter driven compressor operating method of the present invention, in the inverter driven compressor operating method of any of the third to fifth aspects, the number of rotations of said motor (M1) is increased while said preparatory operation is being performed.

According to a first aspect of the compressor driving device of the present invention, a compressor driving device that drives a compressor that compresses a refrigerant comprises: a motor (M1) that drives said compressor; an inverter (4) having a high-arm-side switch (401) and a boot capacitor (407) functioning as an operating power supply for outputting a switch signal to said high-arm-side switch, said inverter supplying an alternating current to said motor; and a controller (5, 6) that causes said inverter to perform an operation of charging said boot capacitor performed prior to a normal operation of said compressor at a carrier frequency that is lower than a carrier frequency for said normal operation.

According to a second aspect of the compressor driving device of the present invention, in the compressor driving device of the first aspect, the carrier frequency for said boot capacitor (407) charging operation is equal to or lower than a carrier frequency for a preparatory operation performed prior to said normal operation.

According to a third aspect of the compressor driving device of the present invention, in the compressor driving device of the first aspect, said controller (5, 6) causes said inverter (4) to perform a preparatory operation between said boot capacitor (407) charging operation and said normal operation, said preparatory operation being performed at a carrier frequency that is lower than the carrier frequency for said normal operation, and said controller causes said inverter to move to the normal operation while increasing the carrier frequency to the carrier frequency for said normal operation in a monotone nondecreasing manner.

According to a fourth aspect of the compressor driving device of the present invention, in the compressor driving device of the third aspect, said preparatory operation is a liquid discharging operation in which said refrigerant accumulated inside said compressor (11) is discharged.

According to a fifth aspect of the compressor driving device of the present invention, in the compressor driving device of the third or fourth aspect, the carrier frequency used in said boot capacitor (407) charging operation is not more than the carrier frequency used in said preparatory operation.

According to a sixth aspect of the compressor driving device of the present invention, in the compressor driving device of any of the third to fifth aspects, said controller (5, 6) increases the number of rotations of said motor while said preparatory operation is being performed.

Effects of Invention

According to the first aspect of the inverter driven compressor operating method of the present invention and the first aspect of the compressor driving device, it is possible to reduce the leakage current occurring during the boot capacitor charging operation. The leakage current reducing effect is significant because the leakage current occurring during the boot capacitor charging operation prior to normal operation is larger than those occurring during other preparatory operations.

According to the second aspect of the inverter driven compressor operating method of the present invention and the second aspect of the compressor driving device, it is possible to reduce the noise of the motor that occurs during another preparatory operation.

According to the third aspect of the inverter driven compressor operating method of the present invention or the third aspect of the compressor driving device, it is possible to omit boot capacitor charging operation between the preparatory operation and normal operation, and therefore to reduce the leakage current.

The liquid discharging operation causes a differential pressure within the compressor. According to the fourth aspect of the inverter driven compressor operating method of the present invention or the fourth aspect of the compressor driving device, the operation moves to normal operation without stopping the compressor, which makes it possible to prevent activation failure of the compressor caused by the differential pressure.

According to the fifth aspect of the inverter driven compressor operating method of the present invention or the fifth aspect of the compressor driving device, the leakage current reducing effect is significant because the leakage current occurring when charging the boot capacitor is larger than those occurring in other operations.

According to the sixth aspect of the inverter driven compressor operating method of the present invention or the sixth aspect of the compressor driving device, it is possible to shorten the time necessary for the preparatory operation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram illustrating parameters used in the liquid discharging operation of the compressor driving device.

FIG. 8A and FIG. 8B are diagrams illustrating a number-of-rotations command and the actual number of rotations used in the liquid discharging operation of the compressor driving device.

BEST MODE FOR CARRYING OUT THE INVENTION

First Preferred Embodiment

Figure 1:
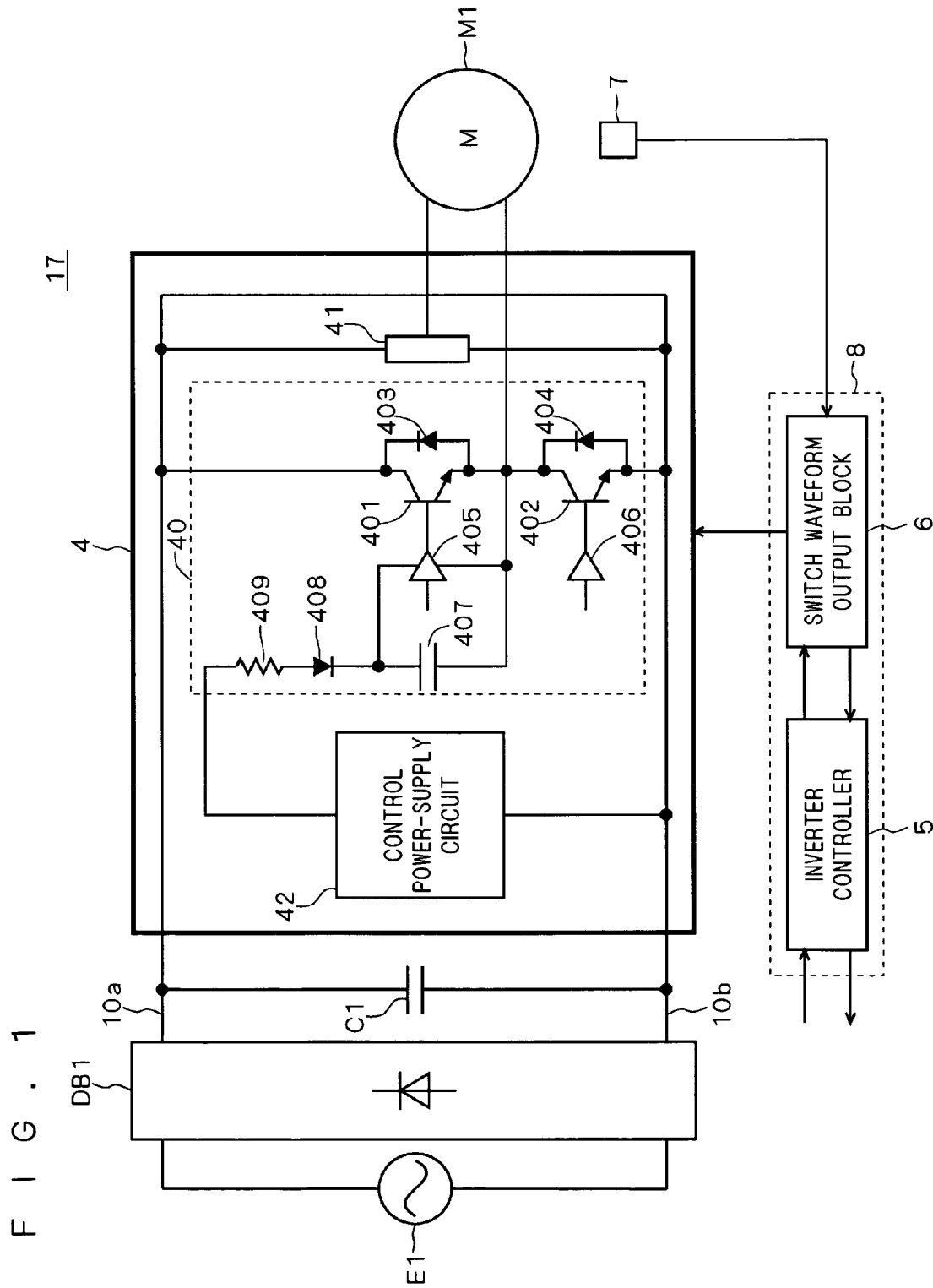
FIG. 1 is a schematic diagram illustrating the configuration of a compressor driving device.

A first preferred embodiment of the inverter driven compressor operating method and the compressor driving device according to the present invention will now be described. FIG. 1 is a schematic diagram illustrating the configuration of a compressor driving device 17. The compressor driving device 17 includes an ac power supply E1, a diode bridge DB1, a smoothing capacitor C1, an inverter 4, a motor M1, an inverter controller 5, a switch waveform output block 6, and a position detecting sensor 7.

The ac power supply E1 can be a single-phase ac power supply, for example. The ac power supply E1 can also be a three-phase ac power supply.

The diode bridge DB1 is connected to the ac power supply E1. It applies full-wave rectification to the ac voltage from the ac power supply E1 and outputs dc voltage between a high-potential output line 10a and a low-potential output line 10b.

The smoothing capacitor C1 is connected between the high-potential output line 10a and the low-potential output line 10b, and smoothes the dc voltage from the diode bridge DB1.

The inverter 4 includes power modules 40 and 41 and a control power-supply circuit 42. The power module 40 includes a high-arm-side transistor 401, a low-arm-side transistor 402, free-wheeling diodes 403 and 404, a high-arm control circuit 405, a low-arm control circuit 406, a boot capacitor 407, a diode 408, and a resistor 409.

The high-arm-side transistor 401 and the low-arm-side transistor 402 are series-connected in the same direction between the high-potential output line 10a and the low-potential output line 10b. The free-wheeling diodes 403 and 404 are connected in parallel and in an opposite direction respectively to the high-arm-side transistor 401 and the low-arm-side transistor 402. The connection point between the high-arm-side transistor 401 and the low-arm-side transistor 402 is connected to the motor M1.

The high-arm control circuit 405 and the low-arm control circuit 406 are connected respectively to the bases of the high-arm-side transistor 401 and the low-arm-side transistor 402. They output switch signals from the switch waveform output block 6 respectively to the high-arm-side transistor 401 and the low-arm-side transistor 402.

The high-arm control circuit 405 is supplied with the dc power supply from the control power-supply circuit 42 through the resistor 409, diode 408, and boot capacitor 407 in this order. The boot capacitor 407 functions as an operating power supply for the high-arm control circuit 405, i.e. as an operating power supply for outputting a switch signal to the high-arm-side transistor 401. At the start of operation of the air conditioner, the boot capacitor 407 is not electrically charged, and it is therefore necessary to charge the boot capacitor 407 prior to the start of operation.

The power module 41 is configured in the same manner as the power module 40, and it is therefore not described herein.

The position detecting sensor 7 detects the position of the rotor (not shown) of the motor M1, and outputs a position detect signal to the switch waveform output block 6.

The inverter controller 5 is connected between the switch waveform output block 6 and an outside not shown (e.g. an outdoor unit controller), and it sends/receives signals between them to control the operations of the compressor driving device 17.

The switch waveform output block 6 outputs to the inverter 4 a switch signal that is generated at a given carrier frequency by PWM (Pulse Width Modulation). On the basis of the inputted switch signal, the inverter 4 converts the direct current smoothed by the smoothing capacitor C1 into an alternating current, and the alternating current is supplied from the inverter 4 to the motor M1. The motor M1 is excited by the alternating current to rotate. Then, the rotation of the motor M1 drives a load not shown (e.g. a compressor). The switch waveform output block 6 is capable of outputting a switch signal to the inverter 4, for synchronous operation performed at the activation of the compressor 11 and for position detecting operation based on the position detect signal from the position detecting sensor 7. In the description below, the section including the inverter controller 5 and the switch waveform output block 6 is collectively referred to also as a switching control block 8. The position sensor 7 is not necessarily required, and the position may be detected on the basis of the current flowing in the motor M1, for example.

In the compressor driving device thus configured, no charge is stored in the boot capacitor 407 at the start of normal operation, and it is therefore necessary to charge the boot capacitor 407 prior to the start of normal operation. Also, when the ambient temperature is low, preheating operation or the like may be performed as one of preparatory operations prior to the start of normal operation. The preheating operation is performed by supplying current to the motor M1 to preheat the motor M1 by operating the inverter 4 with the switching control block 8 prior to normal operation.

Now, it has been found by experiment that, at the same carrier frequency, the leakage current occurring during boot capacitor charging operation is larger than leakage currents occurring during other operations (preheating operation, normal operation, etc.).

Now, the operation of this compressor driving device will be described. In the compressor driving device 17, boot capacitor charging operation is performed prior to normal operation. More specifically, for example, the switching control block 8 outputs a switch signal at a carrier frequency f1 to the low-arm control circuit 406, so as to repeatedly turn ON/OFF the low-arm-side transistor 402. Then, a current intermittently flows in the closed circuit composed of the control power-supply circuit 42, resistor 409, diode 408, boot capacitor 407, and low-arm-side transistor 402, and voltage is charged in the boot capacitor 407.

Similarly, the switching control block 8 outputs a switch signal at the carrier frequency f1 to a low-arm control circuit (not shown) of the power module 41, so as to repeatedly turn ON/OFF a low-arm-side transistor (not shown). Then, voltage is charged in a boot capacitor (not shown) of the power module 41.

Figure 2:
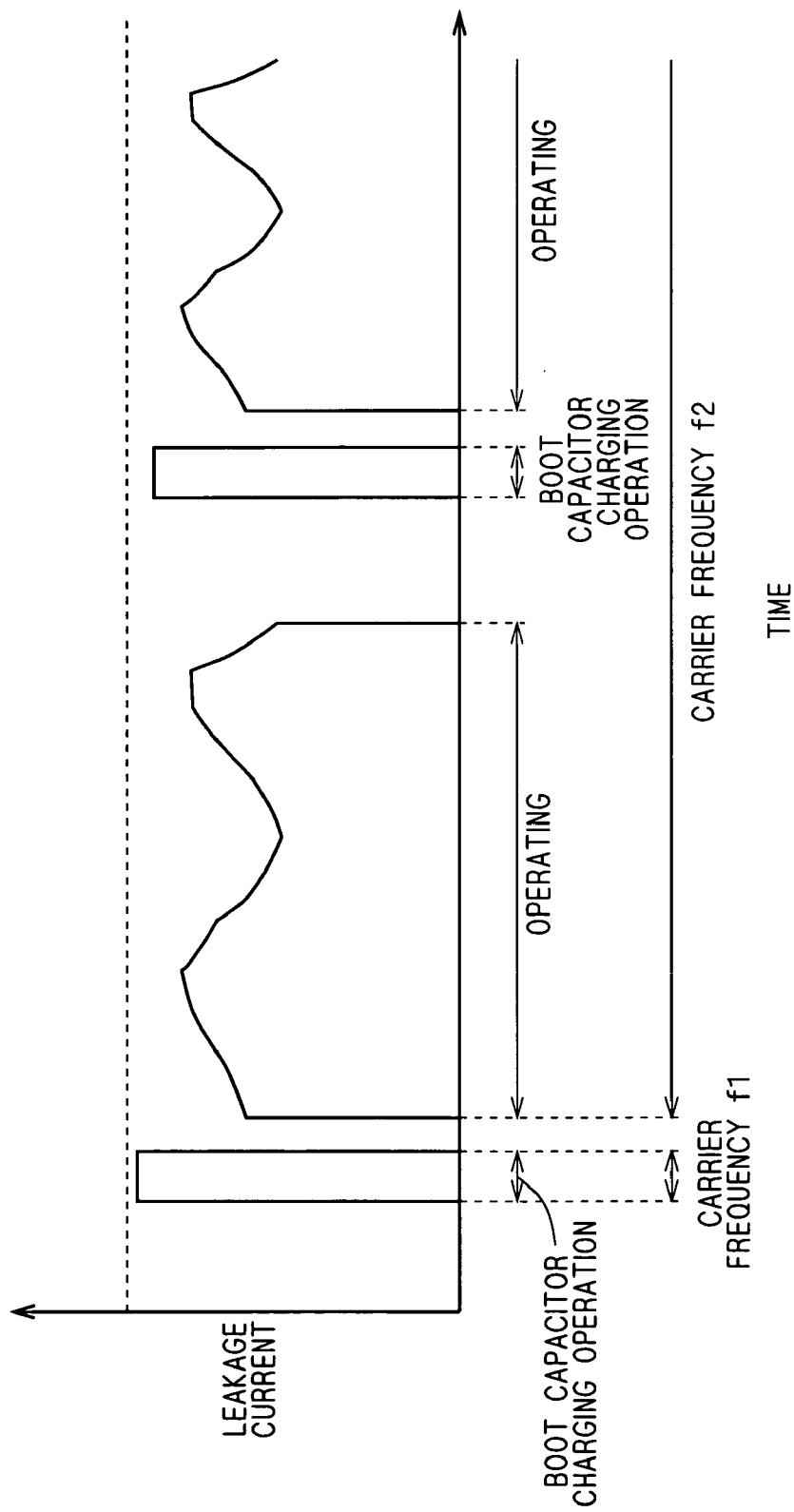
FIG. 2 is a diagram illustrating leakage current.

Then, when the boot capacitor charging operation is ended, the switching control block 8 once stops the output of the switch signal, and then immediately moves to normal operation at a carrier frequency f2 (>f1). In the first preferred embodiment, the boot capacitor charging operation performed prior to normal operation is conducted at the carrier frequency f1 that is lower than the carrier frequency f2 used in normal operation. FIG. 2 is a diagram illustrating the leakage current that occurs during the operations described above. For comparison, FIG. 3 shows the leakage current that occurs when the boot capacitor charging operation is performed at the carrier frequency f2 and normal operation is then performed at the carrier frequency f2.

Figure 3:
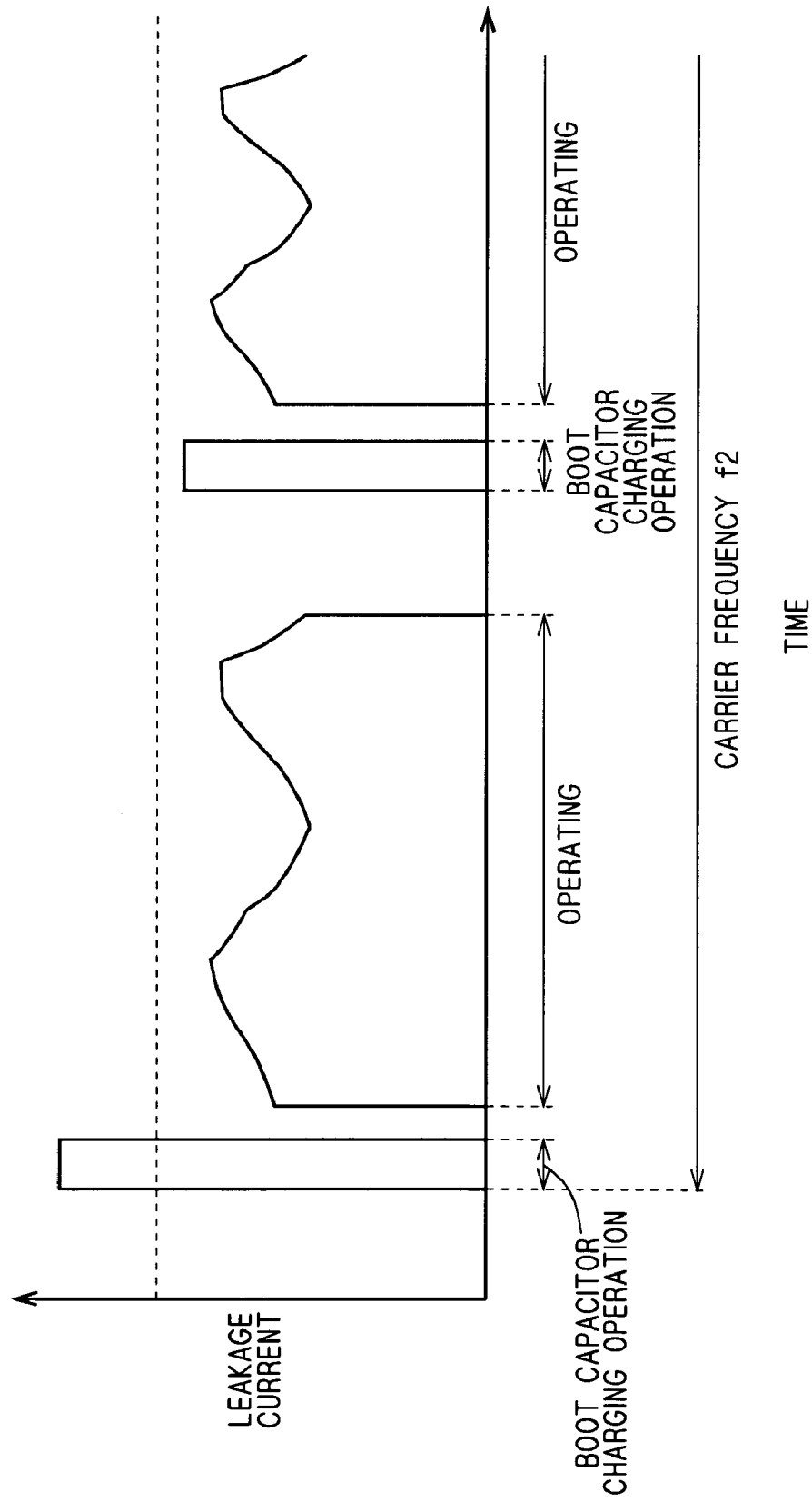
FIG. 3 is a diagram illustrating leakage current.

As shown in FIGS. 2 and 3, the carrier frequency f1 used in the boot capacitor charging operation prior to normal operation is set lower than the carrier frequency f2 used in normal operation, whereby the leakage current occurring during the boot capacitor charging operation can be lowered below a given reference value. It is thought that this is achieved because setting the carrier frequency lower increases the impedance of parasitic electrostatic capacitance existing in the path of the leakage current (e.g. the liquid refrigerant accumulated inside the compressor functions as a dielectric). The leakage current reducing effect is especially significant according to the first preferred embodiment because the leakage current occurring in the boot capacitor charging operation is larger than leakage currents occurring in other operations. The reference value mentioned herein can be a reference value for the tripping of a leakage breaker (not shown) provided in the compressor driving device, for example.

Next, an example will be described in which preheating operation is performed prior to normal operation. Boot capacitor charging operation is also performed prior to the preheating operation, since no charge is stored in the boot capacitor at the start of the preheating operation. The aspect is considered, in which a boot capacitor charging operation is performed at the carrier frequency f1, and then the operation is once stooped, and a preheating operation is immediately performed at the carrier frequency f1. In this case, the leakage current occurring in the boot capacitor charging operation and preheating operation is below the reference value.

Now, when the boot capacitor charging operation is performed at the carrier frequency f1 in order to lower the leakage current occurring during the charging operation below the given reference value, then it is not necessarily required that the preheating operation be performed at the carrier frequency f1 in order to reduce the leakage current occurring during the preheating operation below the given reference value. The leakage current occurring during preheating operation can be lowered below the given reference value by performing the preheating operation at a carrier frequency f3 (f1<f3).

Then, considering that the noise of the motor M1 becomes larger as the carrier frequency becomes lower, the noise of the motor M1 occurring during preheating operation can be reduced when the carrier frequency for preheating operation is set higher than the carrier frequency for boot capacitor charging operation.

The first preferred embodiment has described an example in which a single-phase alternating current is outputted from the inverter 4 to a single-phase motor M1, but it is not limited thereto and a three-phase alternating current may be outputted from the inverter 4 to a three-phase motor M1.

Also, preheating operation has been described as preparatory operation performed prior to normal operation, but it is not limited thereto. For example, when the compressor driving device is used for an air conditioner, it can be liquid discharging operation for discharging a liquid refrigerant accumulated in the compressor into a refrigerant circuit (which will be described in detail in a second preferred embodiment). When preheating operation and liquid discharging operation are performed, the carrier frequency for boot capacitor charging operation is set the smallest among the carrier frequencies used for the preparatory operation (preheating operation and liquid discharging operation).

Second Preferred Embodiment

{Configuration of Air Conditioner}

Figure 4:
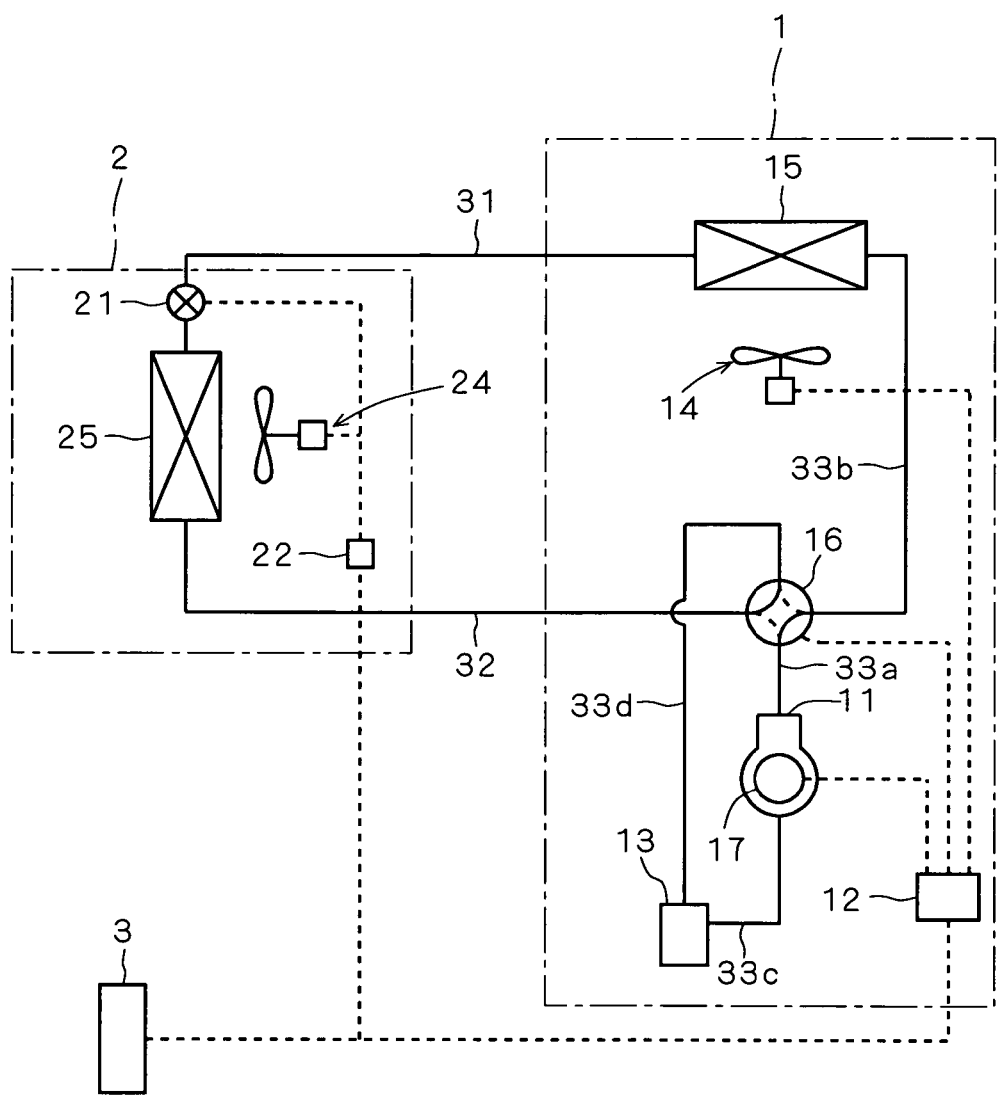
FIG. 4 is a schematic diagram illustrating an example configuration of an air conditioner.

A second preferred embodiment of the inverter driven compressor operating method and the compressor driving device of the present invention will now be described. FIG. 4 is a schematic diagram showing an example configuration of an air conditioner. The air conditioner includes an outdoor unit 1, an indoor unit 2, liquid refrigerant connection piping 31, gas refrigerant connection piping 32, and a remote controller 3. The outdoor unit 1 and the indoor unit 2 are connected to each other through the liquid refrigerant connection piping 31 and the gas refrigerant connection piping 32 to form a refrigerant circuit of the air conditioner. A plurality of indoor units 2 may be parallel-connected to the outdoor unit 1.

The outdoor unit 1 includes a compressor 11, a compressor driving device 17, an outdoor unit controller 12, an accumulator 13, a fan 14, a heat exchanger 15, and a four-way valve 16. The indoor unit 2 includes an expansion valve 21, an indoor unit controller 22, a fan 24, and a heat exchanger 25.

The compressor 11 is driven by the compressor driving device 17, and compresses and discharges the refrigerant. The configuration of the compressor driving device 17 is the same as that shown in FIG. 1. The inverter controller 5 is connected between the outdoor unit controller 12 and the switch waveform output block 6.

The four-way valve 16 is a valve for switching the flow of refrigerant. For cooling operation, in order to cause the heat exchanger 15 to function as a condenser of the refrigerant compressed in the compressor 11 and the heat exchanger 25 to function as an evaporator of the refrigerant condensed in the heat exchanger 15, the four-way valve 16 connects the refrigerant piping 33a on the outlet side of the compressor 11 and the refrigerant piping 33b on the gas side of the heat exchanger 15, and connects the refrigerant piping 33c on the inlet side of the compressor 11 (specifically, the refrigerant piping 33d on the inlet side of the accumulator 13) and the gas refrigerant connection piping 32 (the solid line in the four-way valve 16 in FIG. 4).

For heating operation, in order to cause the heat exchanger 25 to function as a condenser of the refrigerant compressed in the compressor 11 and the heat exchanger 15 to function as an evaporator of the refrigerant condensed in the heat exchanger 25, the four-way valve 16 connects the refrigerant piping 33a and the gas refrigerant connection piping 32, and connects the refrigerant piping 33d and the refrigerant piping 33b (the dotted line in the four-way valve 16 in FIG. 4).

The accumulator 13 is a vessel that is connected between the inlet side of the compressor 11 and the four-way valve 16 and capable of accumulating excess refrigerant occurring in the refrigerant circuit.

The fan 14 takes in outside air and supplies it to the heat exchanger 15, so as to promote the heat exchange between the outside air and the refrigerant flowing in the heat exchanger 15.

The outdoor unit controller 12 is electrically connected to the remote controller 3, the indoor unit controller 22, the fan 14, the four-way valve 16, and the compressor driving device 17. The outdoor unit controller 12 receives commands (e.g. commands for specifying to heating operation, cooling operation, etc.) from the remote controller 3 and controls the fan 14, the four-way valve 16, and the compressor driving device 17, and also outputs control signals to the indoor unit controller 22 on the basis of the commands.

The expansion valve 21 is connected on the liquid refrigerant connection piping 31 between the heat exchangers 15 and 25, and it is subjected to throttle expansion the liquid refrigerant sent out from a heat exchanger functioning as a condenser and sends it to a heat exchanger functioning as an evaporator.

The fan 24 takes in outside air and supplies it to the heat exchanger 25, in order to promote the heat exchange between the outside air and the refrigerant flowing in the heat exchanger 25.

The indoor unit controller 22 is electrically connected to the remote controller 3, the outdoor unit controller 12, the expansion valve 21, and the fan 24. The indoor unit controller 22 is capable of monitoring commands from the remote controller 3, and controlling the opening of the expansion valve 21 and the number of rotations of the fan 24 on the basis of control signals from the outdoor unit controller 12. It is not always necessary to provide the expansion valve 21 in the indoor unit 2, but it may be provided in the outdoor unit 1.

{Outline of Compressor Operating Method}

Figure 5:
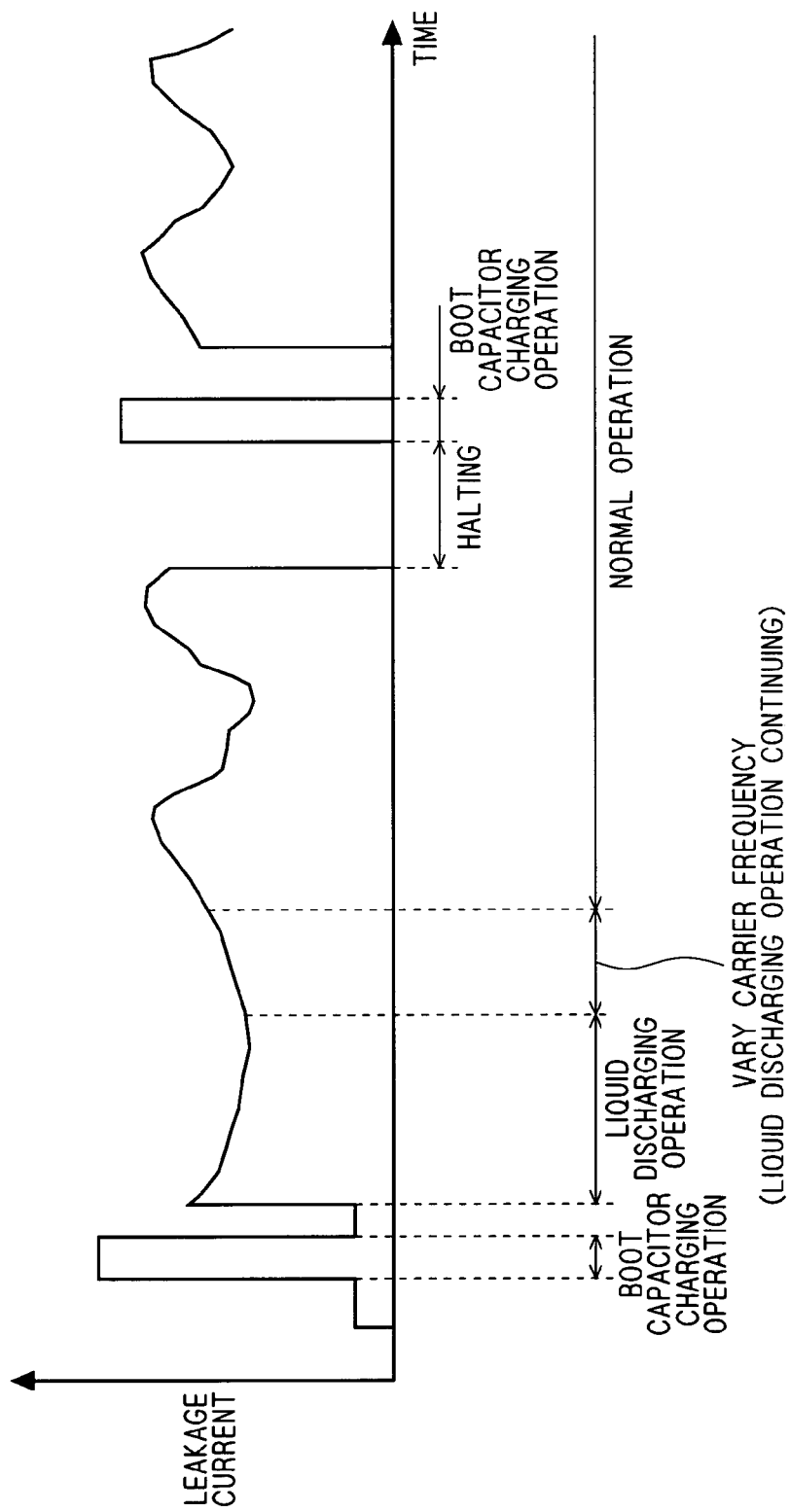
FIG. 5 is a diagram illustrating an example of leakage current in individual operating modes.

Next, the outline of the method for operating the compressor driving device will be described referring to FIG. 5. The details will be described later. FIG. 5 is a diagram illustrating the leakage currents occurring in individual operation modes. As shown in FIG. 5, this air conditioner performs boot capacitor charging operation and liquid discharging operation (corresponding to preparatory operation) prior to normal operation.

The boot capacitor charging operation is an operation for charging a boot capacitor of the inverter 4. More specifically, the switch waveform output block 6 outputs a switch signal to the inverter 4, for example to repeatedly turn ON/OFF the low-arm-side transistor (see FIG. 1). As shown in FIG. 5, the leakage current occurring in the boot capacitor charging operation is larger than those in other operation modes.

Also, because the voltage charged in the boot capacitor is discharged by a stop of the motor M1, boot capacitor charging operation is performed every time the operation is stopped and restarted (see the boot capacitor charging operation during normal operation shown in FIG. 5). In order to reduce the leakage current, the boot capacitor charging operation prior to the liquid discharging operation uses a carrier frequency having a smaller value than that for normal operation.

The liquid discharging operation is an operation for resolving the accumulation of refrigerant. The liquid refrigerant functions as a dielectric of stray capacitance in the leakage current path from the compressor 11 (the parasitic electrostatic capacitance existing in the leakage current path described in the first preferred embodiment). Accordingly, the compressor 11 is operated at low speed prior to normal operation in order to discharge liquid refrigerant staying inside the compressor 11 into the refrigerant piping 33a (see FIG. 4). The liquid discharging operation reduces the stray capacitance and thus contributes to the reduction of leakage current. Furthermore, in order to reduce the leakage current, the value of the carrier frequency for the liquid discharging operation is set smaller than that for normal operation. This is because the impedance of the stray capacitance becomes higher as the carrier frequency becomes lower.

It is desired that the carrier frequency for boot capacitor charging operation be equal to or lower than the carrier frequency for liquid discharging operation. In general, the leakage current occurring during boot capacitor charging operation is larger than leakage currents occurring during other operations. Particularly, in the boot capacitor charging operation performed prior to the liquid discharging operation, the stray capacitance in the leakage current path from the compressor 11 is high due to the liquid refrigerant, and so the leakage current reducing effect is significant in this case.

When the liquid refrigerant accumulated inside the compressor 11 has been sufficiently discharged to the refrigerant piping, the operation moves to normal operation while gradually increasing the carrier frequency in a monotone manner to the value used for normal operation. In other words, the carrier frequency is increased while continuing the liquid discharging operation, and the normal operation is started when the carrier frequency reaches the value for normal operation. The liquid discharging operation will be described in detail later.

Thus, it is possible to move to normal operation without stopping the compressor 11 (the motor M1) after the completion of liquid discharging operation. As compared with a case where the compressor 11 (the motor M1) is once stopped after the completion of liquid discharging operation and then the carrier frequency is varied to move to normal operation, the boot capacitor charging operation between the liquid discharging operation and normal operation can be omitted, and so the leakage current is reduced.

The liquid discharging operation causes a differential pressure inside the compressor 11. When the compressor 11 (the motor M1) is once stopped after the completion of liquid discharging operation and then normal operation is performed, then an activation failure of the compressor 11 may occur due to the differential pressure in the compressor 11. However, in this operating method, sift to normal operation is conducted without stopping the compressor 11 after the completion of liquid discharging operation, and thus such activation failure of the compressor 11 due to the differential pressure can be resolved.

{Details of Compressor Operating Method}

Figure 6:
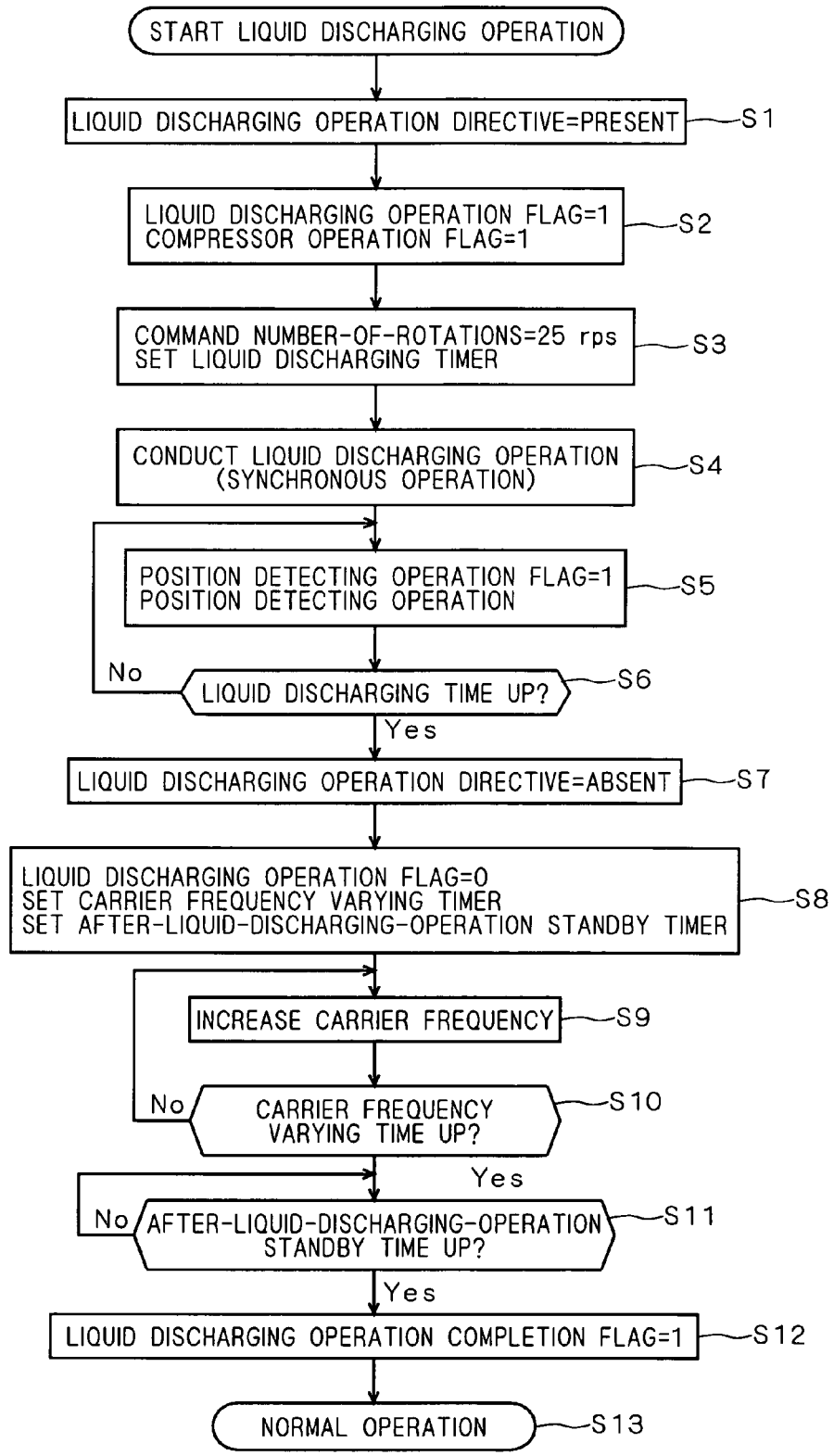
FIG. 6 is a flowchart illustrating liquid discharging operation of the compressor driving device.

Next, specific operation steps of the compressor driving device 17 performed during a liquid discharging operation will be described. FIG. 6 is a flowchart illustrating the flow of operation steps performed during the liquid discharging operation of the compressor driving device 17, and FIG. 7 is a diagram illustrating the states of parameters used for this operation.

First, the parameters used for liquid discharging operation will be described (see FIG. 7). A liquid discharging operation directive is a parameter that is outputted from the outdoor unit controller 12 to the inverter controller 5 at the start of liquid discharging operation, which is active H. A liquid discharging operation flag, a compressor operation flag, and a liquid discharging operation completion flag are rewritable by the inverter controller 5, and they can be outputted to the outdoor unit controller 12 and the switch waveform output block 6. A position detecting operation flag is rewritable by the switch waveform output block 6, and can be outputted to the inverter controller 5.

A number-of-rotations command is a signal for indicating the number of rotations of the motor M1, which is outputted from the outdoor unit controller 12 to the inverter controller 5, and outputted from the inverter controller 5 to the switch waveform output block 6. An operation command is a signal to indicate to operate the motor M1 (the compressor 11), which is outputted from the inverter controller 5 to the switch waveform output block 6. The parameters are initially set at low potential (L or "0"). FIG. 7 further shows the carrier frequency used in the liquid discharging operation and the actual number of rotations of the motor M1.

Next, the operation steps will be specifically described referring to FIG. 6. First, in Step S1, the outdoor unit controller 12 raises the liquid discharging operation directive to H and outputs it to the inverter controller 5. FIG. 7 shows the liquid discharging operation directive after it is raised to H.

Next, in Step S2, when the inverter controller 5 determines that the conditions are met: the compressor operation flag=0 and the liquid discharging operation directive=present (H) and the liquid discharging operation completion flag=0, then the liquid discharging operation flag is set to 1. FIG. 7 shows the liquid discharging operation flag after it is set at 1. Then, at Time t1, the compressor operation flag is set to 1.

Next, in Step S3, when the outdoor unit controller 12 determines that the conditions are met: the liquid discharging operation directive=present (H) and the compressor operation flag=1, then it outputs the number-of-rotations command (e.g. 25 rps) to the inverter controller 5 to indicate the number of rotations of the motor M1 during the liquid discharging operation (see Time t1 in FIG. 7). At the same time, a liquid discharging operation timer is set, e.g. with a timer circuit not shown.

Next, in Step S4, when the inverter controller 5 determines that the conditions are met: the compressor operation flag=1 and the liquid discharging operation directive=present (H) and the liquid discharging operation flag=1 and the liquid discharging operation completion flag=0, then the operation command and the number-of-rotations command are outputted to the switch waveform output block 6 (see Time t1 in FIG. 7).

The switch waveform output block 6 outputs a switch signal with an activating operation pattern to the inverter 4, so as to drive the motor M1 by synchronous operation. Then, the rotation of the motor M1 drives the compressor 11. At this time, the carrier frequency is at a predetermined value that is lower than the carrier frequency for normal operation.

Next, in Step S5, after a given time has passed from the start of the liquid discharging operation, for example, the switch waveform output block 6 moves from the synchronous operation to position detecting operation based on the position detect signal from the position detecting sensor 7, and also sets the position detecting operation flag to 1 (see Time t2 in FIG. 7). After the shift to the position detecting operation, the inverter controller 5 may increase the number-of-rotations command to increase the number of rotations of the motor M1 (the compressor 11). This will be described later.

Next, in Step S6, the outdoor unit controller 12 checks whether the liquid discharging timer has passed a predetermined Time T1 which is set preliminarily, and it performs Step S5 when it has not passed, and it performs Step S7 when it has passed. Time T1 is a time that is sufficient to end the liquid discharging operation.

In Step S7, the outdoor unit controller 12 brings down the liquid discharging operation directive to L.

Next, in Step S8, when the inverter controller 5 determines that the conditions are met: the compressor operation flag=1 and the position detecting operation flag=1 and the liquid discharging operation flag=1 and the liquid discharging operation directive=absent (L), then it sets the liquid discharging operation flag to 0 and outputs it to the switch waveform output block 6, and also sets an after-liquid-discharging-operation standby timer, e.g. with a timer circuit not shown.

When the switch waveform output block 6 determines that the conditions are met: the liquid discharging operation flag=0 and the number-of-rotations command≠0, then it sets a carrier frequency varying time timer, e.g. with a timer circuit not shown.

Next, in Step S9, the switch waveform output block 6 increases the carrier frequency at a given rate (see Time t3 in FIG. 7). In this case, the number of rotations of the motor M1 is not changed.

Next, in Step S10, the switch waveform output block 6 checks whether the carrier frequency varying time timer has passed a predetermined Time T2 which is set preliminarily, and it performs Step S9 again when it has not passed, and performs Step S11 when it has passed. Time T2 is a time necessary for the carrier frequency to increase from a value for liquid discharging operation to a value for normal operation.

Next, in Step S11, the inverter controller 5 checks whether the after-liquid-discharging-operation standby time timer has passed a predetermined Time T3 (>T2) which is set preliminarily, and it performs Step S10 again when it has not passed, and performs Step S12 when it has passed.

In Step S12, the inverter controller 5 sets the liquid discharging operation completion flag to 1 and outputs it to the outdoor unit controller 12 (see Time t4 in FIG. 7).

Next, in Step S13, when the outdoor unit controller 12 determines that the condition is met: the liquid discharging operation completion flag=1, then it moves to normal operation and outputs a desired number-of-rotations command to the inverter controller 5. The inverter controller 5 outputs the number-of-rotations command to the switch waveform output block 6, and the switch waveform output block 6 outputs a switch signal to the inverter 4 on the basis of the number-of-rotations command.

In the steps described above, when it is determined that conditions are not met for some trouble, the operation can be stopped.

The section composed of the outdoor unit controller 12, the inverter controller 5, and the switch waveform output block 6 can be regarded as a controller block.

As described above, the sift to normal operation is conducted from liquid discharging operation without stopping the compressor, so that a boot capacitor charging operation between the liquid discharging operation and normal operation can be omitted. Also, it is possible to resolve troubles due to a differential pressure inside the compressor 11 caused by the liquid discharging operation.

Also, as shown by the actual number of rotations of the motor M1 in FIG. 7, the normal operation is performed with the number of rotations increased in advance, which shortens the time necessary to achieve a desired number of rotations in normal operation.

This preferred embodiment has described Time T1 as a time that is sufficient to end the liquid discharging operation, but it is limited thereto and it works as long as the liquid discharging operation is ended within Time T1+T3.

Also, since sift to position detecting operation is conducted during liquid discharging operation, the number of rotations of the motor M1 may be increased after the shift to the position detecting operation. FIG. 8B is a diagram illustrating the number-of-rotations command and the actual number of rotations in a case where the number of rotations is increased during the position detecting operation in the liquid discharging operation, and FIG. 8A is a diagram illustrating, for comparison, the number-of-rotations command and the actual number of rotations in FIG. 7.

As shown in FIG. 8B, after the shift to the position detecting operation during the liquid discharging operation, for example at Time t2' (in Step S5 in FIG. 6), the inverter controller 5 increases the number-of-rotations command and outputs it to the switch waveform output block 6, so as to increase the actual number of rotations of the motor M1. The outdoor unit controller 12 may increase the number-of-rotations command. In this case, it is possible to shorten the time necessary for the liquid discharging operation. Also, because the number of rotations is increased during the liquid discharging operation, it is possible to further shorten the time to reach the desired number of rotations in normal operation.

Figure 9A:
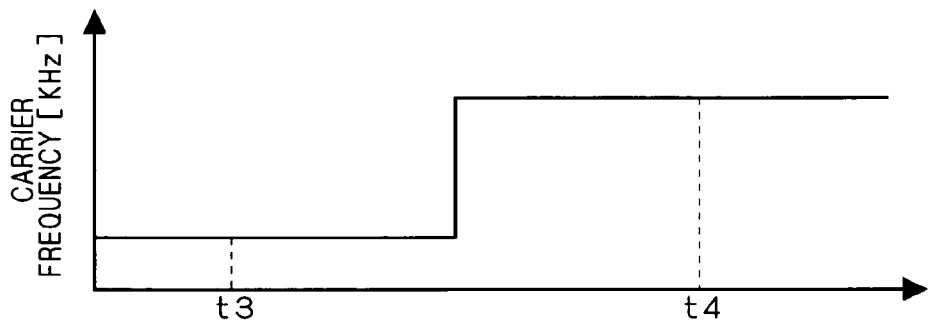
FIG. 9A to FIG. 9D are diagrams illustrating patterns for increasing the carrier frequency.
Figure 9B:
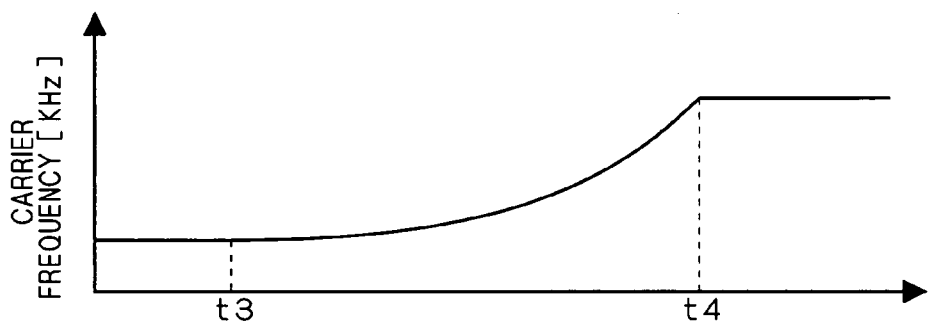
Figure 9C:
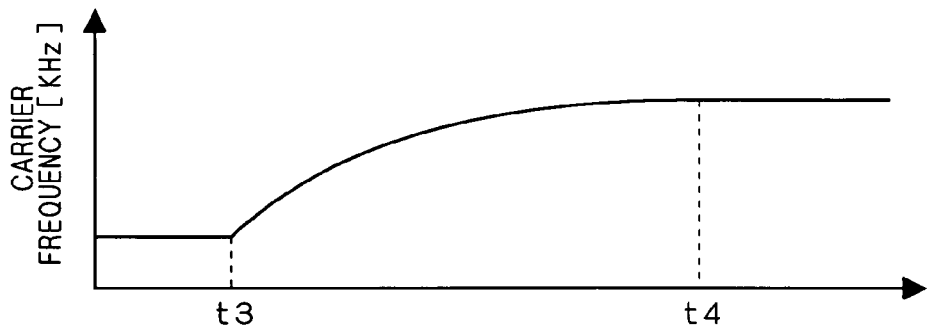
Figure 9D:
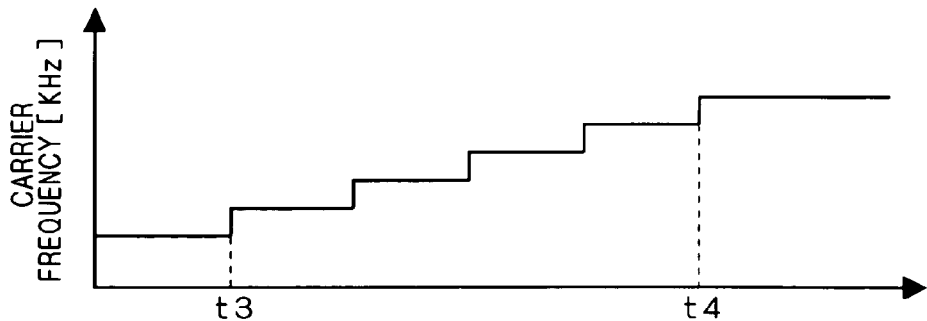

This preferred embodiment increases the carrier frequency at a given rate in Step S9, but it is not limited thereto and it may be increased as shown in FIG. 9A to FIG. 9D, for example. That is, as shown in FIG. 9A, the carrier frequency may be increased in a step. As shown in FIG. 9B, the carrier frequency may be increased in such a manner that the increasing curve is convex downward. As shown in FIG. 9C, the carrier frequency may be increased in such a manner that the increasing curve is convex upward. As shown in FIG. 9D, the carrier frequency may be increased stepwise.

However, a rapid variation of the carrier frequency, e.g. as shown in FIG. 9A, may cause instability of control. Accordingly, it is desirable to increase the carrier frequency by taking a certain time period, as shown in FIG. 9B to FIG. 9D and Step S9.

The second preferred embodiment has described an example in which the inverter 4 outputs a single-phase alternating current to a single-phase motor M1, but it is limited thereto and the inverter 4 may output a three-phase alternating current to a three-phase motor M1.

<Modification>

The second preferred embodiment has described liquid discharging operation as an example, but it is limited thereto. For example, it can be applied to preheating operation. The preheating operation is an operation for preheating the motor M1 (the compressor 11). In this case, too, in order to reduce the leakage current, the carrier frequency takes a lower value than the value for normal operation.

Then, when the object of preheating operation is achieved, the carrier frequency is varied to a value for normal operation without stopping the preheating operation, whereby boot capacitor charging operation between the preheating operation and normal operation can be omitted, and the leakage current is reduced.

While the invention has been described in detail, the foregoing description is in all aspects illustrative and not restrictive. It is understood that numerous other modifications and variations can be devised without departing from the scope of the invention.

The invention claimed is:

1. An inverter driven compressor operating method for operating an inverter driven compressor that compresses a refrigerant, said inverter driven compressor being driven by a motor that is supplied with an alternating current from an inverter having a high-arm-side switch and a boot capacitor functioning as an operating power supply for outputting a switch signal to said high-arm-side switch, comprising the steps of:

performing a normal operation in which said compressor is operated; and performing an operation of charging said boot capacitor prior to said normal operation at a carrier frequency that is lower than a carrier frequency for said normal operation, wherein the carrier frequency for said boot capacitor charging operation is equal to or lower than a carrier frequency for a preparatory operation performed prior to said normal operation, the inverter comprises a low-arm-side switch, and the boot capacitor is provided between a connection point between the high-arm-side switch and the low-arm-side switch, and another connection point between a diode and the high-arm-side switch.

2. An inverter driven compressor operating method for operating an inverter driven compressor that compresses a refrigerant, said inverter driven compressor being driven by a motor that is supplied with an alternating current from an inverter having a high-arm-side switch and a boot capacitor functioning as an operating power supply for outputting a switch signal to said high-arm-side switch, comprising the steps of:
performing a normal operation of said compressor;
performing an operation of charging said boot capacitor prior to said normal operation at a carrier frequency that is lower than a carrier frequency for said normal operation;
performing a preparatory operation between said boot capacitor charging operation and said normal operation, said preparatory operation being performed at a carrier frequency that is lower than the carrier frequency for said normal operation; and
moving to said normal operation while increasing the carrier frequency to the carrier frequency for said normal operation in a monotone nondecreasing manner.

3. The inverter driven compressor operating method according to claim 2, wherein said preparatory operation is a liquid discharging operation in which said refrigerant accumulated inside said compressor is discharged.

4. The inverter driven compressor operating method according to claim 3, wherein the carrier frequency used in said boot capacitor charging operation is not more than the carrier frequency for said preparatory operation.

5. The inverter driven compressor operating method according to claim 4, wherein the number of rotations of said motor is increased while said preparatory operation is being performed.

6. The inverter driven compressor operating method according to claim 3, wherein the number of rotations of said motor is increased while said preparatory operation is being performed.

7. The inverter driven compressor operating method according to claim 2, wherein the carrier frequency used in said boot capacitor charging operation is not more than the carrier frequency for said preparatory operation.

8. The inverter driven compressor operating method according to claim 7, wherein the number of rotations of said motor is increased while said preparatory operation is being performed.

9. The inverter driven compressor operating method according to claim 2, wherein the number of rotations of said motor is increased while said preparatory operation is being performed.

10. A compressor driving device that drives a compressor that compresses a refrigerant, comprising:
a motor that drives said compressor;
an inverter having a high-arm-side switch and a boot capacitor functioning as an operating power supply for outputting a switch signal to said high-arm-side switch, said inverter supplying an alternating current to said motor; and
a controller that is programmed to perform an operation of charging said boot capacitor prior to a normal operation of said compressor at a carrier frequency that is lower than a carrier frequency for said normal operation, said compressor being operated in said normal operation, wherein the carrier frequency for said boot capacitor charging operation is equal to or lower than a carrier frequency for a preparatory operation performed prior to said normal operation,
the inverter comprises a low-arm-side switch, and
the boot capacitor is provided between a connection point between the high-arm-side switch and the low-arm-side switch, and another connection point between a diode and the high-arm-side switch.

11. A compressor driving device that drives a compressor that compresses a refrigerant, comprising:
a motor that drives said compressor;
an inverter having a high-arm-side switch and a boot capacitor functioning as an operating power supply for outputting a switch signal to said high-arm-side switch, said inverter supplying an alternating current to said motor; and
a controller that is programmed to perform an operation of charging said boot capacitor prior to a normal operation of said compressor at a carrier frequency that is lower than a carrier frequency for said normal operation, wherein said controller is programmed to perform a preparatory operation between said boot capacitor charging operation and said normal operation, said preparatory operation being performed at a carrier frequency that is lower than the carrier frequency for said normal operation, and said controller being programmed to move to the normal operation while increasing the carrier frequency to the carrier frequency for said normal operation in a monotone nondecreasing manner.

12. The compressor driving device according to claim 11, wherein said preparatory operation is a liquid discharging operation in which said refrigerant accumulated inside said compressor is discharged.

13. The compressor driving device according to claim 12, wherein the carrier frequency used in said boot capacitor charging operation is not more than the carrier frequency used in said preparatory operation.

14. The compressor driving device according to claim 13, wherein said controller increases the number of rotations of said motor while said preparatory operation is being performed.

15. The compressor driving device according to claim 12, wherein said controller increases the number of rotations of said motor while said preparatory operation is being performed.

16. The compressor driving device according to claim 11, wherein the carrier frequency used in said boot capacitor charging operation is not more than the carrier frequency used in said preparatory operation.

17. The compressor driving device according to claim 16, wherein said controller increases the number of rotations of said motor while said preparatory operation is being performed.

18. The compressor driving device according to claim 11, wherein said controller increases the number of rotations of said motor while said preparatory operation is being performed.

* * * * *